United States Patent
Hertaus

(10) Patent No.: US 11,083,339 B1
(45) Date of Patent: Aug. 10, 2021

(54) COUNTERTOP APPLIANCE ROLLING TRAY

(71) Applicant: Nifty Home Products Inc., Madison Lake, MN (US)

(72) Inventor: Todd Hertaus, New Market, MN (US)

(73) Assignee: Nifty Home Products Inc., Madison Lake, MN (US)

( * ) Notice: Subject to any disclaimer, the term of this patent is extended or adjusted under 35 U.S.C. 154(b) by 0 days.

(21) Appl. No.: 16/879,510

(22) Filed: May 20, 2020

Related U.S. Application Data

(60) Provisional application No. 62/988,596, filed on Mar. 12, 2020.

(51) Int. Cl.
  *A47J 47/16* (2006.01)
  *A47J 31/44* (2006.01)
  *F16M 11/42* (2006.01)

(52) U.S. Cl.
  CPC ........... *A47J 47/16* (2013.01); *A47J 31/4403* (2013.01); *A47B 2200/0038* (2013.01); *F16M 11/42* (2013.01)

(58) Field of Classification Search
  CPC ...... A47J 47/16; A47J 31/4403; A47J 88/483; A47B 88/41; A47B 88/483; A47B 2210/04; A47B 2088/901; A47B 2210/07; A47B 2210/01; A47B 77/18; A47B 2200/0038; B60B 33/0063; B60B 33/066; B60B 2200/49; F16M 11/42
  See application file for complete search history.

(56) References Cited

U.S. PATENT DOCUMENTS

| | | | | |
|---|---|---|---|---|
| 2,311,928 A | * | 2/1943 | Buehler | B41J 29/06 280/47.33 |
| 4,417,738 A | * | 11/1983 | Kendall | B60B 33/06 16/34 |
| 4,615,502 A | * | 10/1986 | McLaughlin | F16M 11/10 248/176.3 |

(Continued)

*Primary Examiner* — Ko H Chan
(74) *Attorney, Agent, or Firm* — Michael A. Bondi; Moss & Barnett

(57) ABSTRACT

A countertop appliance rolling tray that includes a support surface, at least one first low friction moving device, at least one high friction support and a movement lever. The support surface has a front edge, a back edge, a first side edge and a second side edge that extend there around. An aperture is formed in the support surface. The at least one first low friction moving device is proximate the back edge of the support surface. The at least one high friction support is proximate the front edge of the support surface. The movement lever is operably mounted with respect to the support surface so that the movement lever is operable through the aperture. The movement lever includes at least one second low friction moving device. The movement lever is movable between a first position and a second position. When the movement lever is in the second position, a lower surface of the second low friction moving device is lower than a lower surface of the at least one high friction support. The movement lever is positioned entirely below the support surface such that no portion of the movement lever extends outside of the front edge, the back edge, the first side edge and the second side edge.

18 Claims, 3 Drawing Sheets

(56) References Cited

U.S. PATENT DOCUMENTS

| | | | |
|---|---|---|---|
| 6,216,994 B1* | 4/2001 | Yeh | A47B 21/0314 |
| | | | 248/346.04 |
| 6,240,830 B1* | 6/2001 | Goldston | A47J 31/44 |
| | | | 99/279 |
| 6,470,793 B1* | 10/2002 | Vogt | A47J 31/4403 |
| | | | 99/279 |
| 6,691,961 B2* | 2/2004 | Solomon | A47B 21/03 |
| | | | 248/129 |
| 7,983,035 B1* | 7/2011 | Ting | F16M 11/2021 |
| | | | 361/679.41 |
| 9,192,266 B2* | 11/2015 | Starr | A47J 47/16 |
| 10,100,969 B1* | 10/2018 | Zhu | B62B 5/04 |
| 2001/0035485 A1* | 11/2001 | Davis | A63B 71/023 |
| | | | 248/346.2 |
| 2007/0241452 A1* | 10/2007 | Wu | G06F 1/1613 |
| | | | 257/722 |
| 2013/0186902 A1* | 7/2013 | Bar-Shlomo | B05C 21/00 |
| | | | 220/570 |
| 2017/0188704 A1* | 7/2017 | Lipper McCauley | A47B 88/40 |

* cited by examiner

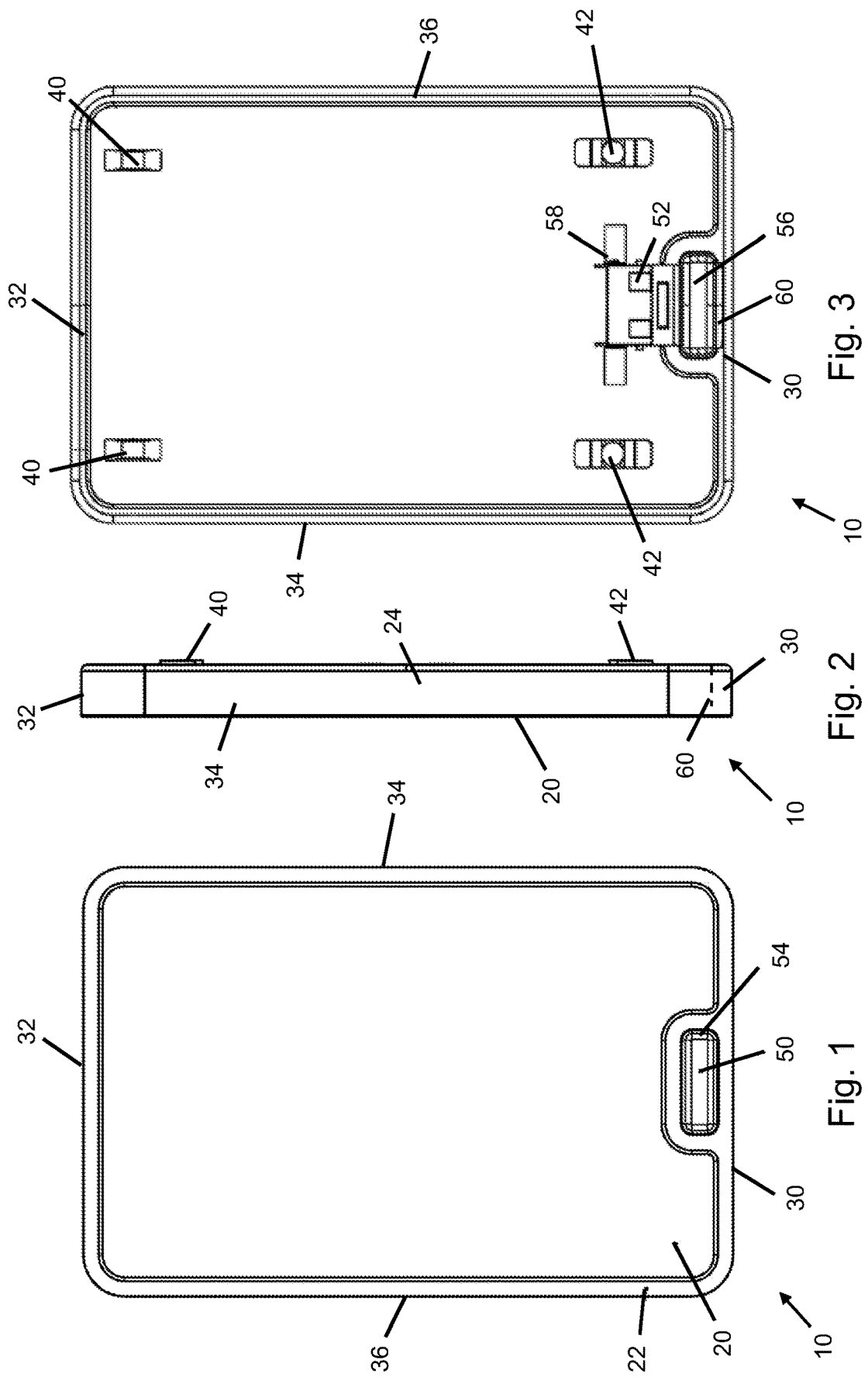

COUNTERTOP APPLIANCE ROLLING TRAY

REFERENCE TO RELATED APPLICATION

This application claims priority to U.S. Applic. No. 62/988,596, which was filed on Mar. 12, 2020. The contents of which are incorporated herein by reference.

FIELD OF THE INVENTION

The invention relates to objects for kitchen organization. More particularly, the invention relates to a countertop appliance rolling tray.

BACKGROUND OF THE INVENTION

There is a limited amount of space on countertops in most kitchens. The countertop is used for storing countertop appliances such as blenders, coffee makers and toasters. The countertop may also be used for storing certain food items, examples of which include fresh fruit and spices, and preparing food.

While it is possible to store these countertop appliances in cabinets, that is typically not desired for countertop appliances that are used on a regular basis. To minimize the interference with performing tasks such as cooking on the countertop, the countertop appliances that are not currently being used may be positioned proximate a wall at a back edge of the countertop.

When it is desired to use the countertop appliance, the item may be moved toward a front edge of the countertop. Such movement not only makes it easier to reach the controls on the countertop appliance but also minimizes interference of the use of the countertop appliance by cabinets that are located at least partially above the countertop appliance.

SUMMARY OF THE INVENTION

An embodiment of the invention is directed to a countertop appliance rolling tray that includes a support surface, at least one first low friction moving device, at least one high friction moving device and a movement lever. The support surface has a front edge, a back edge, a first side edge and a second side edge that extend there around. An aperture is formed in the support surface. The at least one first low friction moving device is proximate the back edge of the support surface. The at least one high friction support is proximate the front edge of the support surface. The movement lever is operably mounted with respect to the support surface so that the movement lever is operable through the aperture. The movement lever includes at least one second low friction moving device. The movement lever is movable between a first position and a second position. When the movement lever is in the second position, a lower surface of the second low friction moving device is lower than a lower surface of the at least one high friction support. The movement lever is positioned entirely below the support surface such that no portion of the movement lever extends outside of the front edge, the back edge, the first side edge and the second side edge.

Another embodiment of the invention is directed to a method of using of a countertop appliance. A countertop appliance rolling tray is provided that includes a support surface, at least one low friction moving device, at least one high friction support and a movement lever. The support surface has a front edge, a back edge, a first side edge and a second side edge that extend there around. An aperture is formed in the support surface. The at least one first low friction moving device is proximate the back edge of the support surface. The at least one high friction support is proximate the front edge of the support surface. The movement lever is operably mounted with respect to the support surface. The movement lever includes at least one second low friction moving device. The movement lever is positioned entirely below the support surface such that no portion of the movement lever extends outside of the front edge, the back edge, the first side edge and the second side edge. The countertop appliance rolling tray is placed on a countertop that has a proximal edge and a distal edge. A countertop appliance is placed on the countertop appliance rolling tray. A force is applied through the aperture to the movement lever. The force moves the movement lever to a second position where a lower surface of the second low friction moving device is lower than a lower surface of the at least one high friction support. The force moves the countertop appliance rolling tray to a use position proximate the distal edge of the countertop. The force is discontinued to permit the movement lever to move to a first position where the lower surface of the second low friction moving device is not lower than the lower surface of the at least one high friction support.

Still another embodiment of the invention is directed to a countertop appliance system that includes a countertop appliance and a countertop appliance rolling tray. The countertop appliance rolling tray includes a support surface, at least one first low friction moving device, at least one high friction moving device and a movement lever. The support surface has a front edge, a back edge, a first side edge and a second side edge that extend there around. An aperture is formed in the support surface. The at least one first low friction moving device is proximate the back edge of the support surface. The at least one high friction support is proximate the front edge of the support surface. The movement lever is operably mounted with respect to the support surface so that the movement lever is operable through the aperture. The movement lever includes at least one second low friction moving device. The movement lever is movable between a first position and a second position. When the movement lever is in the second position, a lower surface of the second low friction moving device is lower than a lower surface of the at least one high friction support. The movement lever is positioned entirely below the support surface such that no portion of the movement lever extends outside of the front edge, the back edge, the first side edge and the second side edge.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

FIG. 1 is a top view of a countertop appliance rolling tray according to an embodiment.

FIG. 2 is a side view of the countertop appliance rolling tray.

FIG. 3 is a bottom view of the countertop appliance rolling tray.

DETAILED DESCRIPTION OF THE INVENTION

Figure 4:
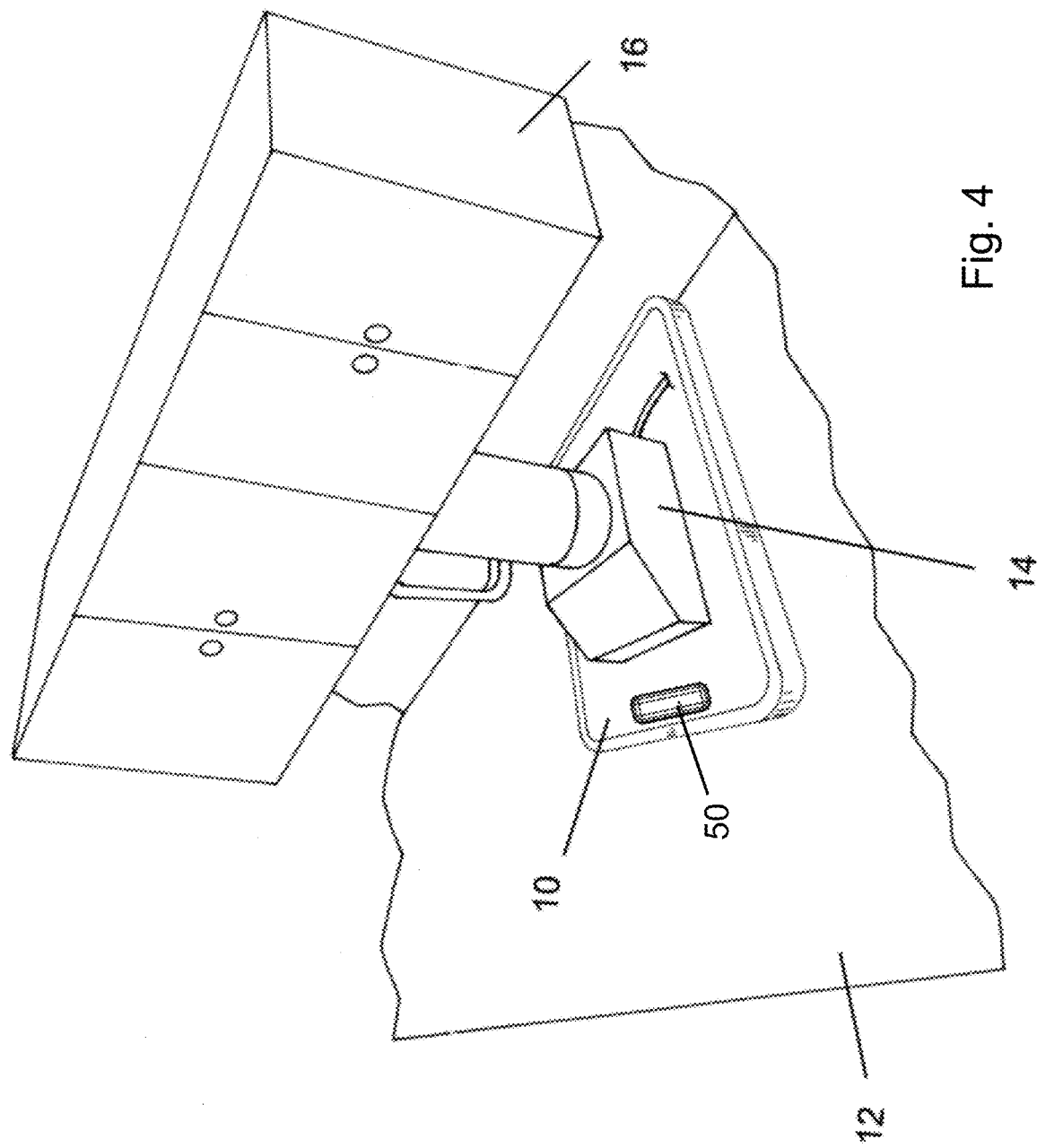
FIG. 4 is a perspective view of the countertop appliance rolling tray with a countertop appliance placed thereon.

An embodiment of the invention is directed to a countertop appliance rolling tray as illustrated at 10 in FIGS. 1-3. The countertop appliance rolling tray 10 is adapted for use on a countertop 12 such as is typically found in a kitchen, as illustrated in FIG. 4.

The countertop appliance rolling tray 10 is adapted for a countertop kitchen appliance 14 to be placed thereon. Examples of appliances 14 that may be used in conjunction with the countertop appliance rolling tray 10 include blenders, coffee makers and toasters.

The countertop appliance rolling tray 10 thereby enables the countertop appliance 14 to be stored on the countertop 12 proximate a back edge of the countertop 12 so that the countertop appliance 14 is readily accessible when it is desired to use the countertop appliance 14 while the countertop appliance 14 does not interfere or impede the use of a portion of the countertop 12 that is proximate a front edge thereof.

Another advantage of the countertop appliance rolling tray 10 is that the countertop appliance 14 may be stored in a reduced height area such as at least partially under a cabinet 16 mounted over the countertop 12. In certain situations, the cabinet 16 would make it difficult or impossible to use features associated with the appliance, examples of which include placing objects into the blender, coffee maker or toaster.

Another important feature of the countertop appliance rolling tray 10 is that an upper surface of the countertop appliance rolling tray 10 is located a small distance above an upper surface of the countertop 12 such as less than about one inch. Such a configuration minimizes the potential that countertop appliances 14 placed on the countertop appliance rolling tray 10 will not fit under the cabinet 16 when placed on the countertop appliance rolling tray 10.

Yet another important feature of the countertop appliance rolling tray 10 is that a relatively low force is needed to move the countertop appliance rolling tray 10 from a stationary configuration to a moving configuration and once the countertop appliance rolling tray 10 is in the moving configuration to move the countertop appliance rolling tray 10 with respect to the countertop or other surface on which the countertop appliance rolling tray 10 is placed. As used herein, the relatively low force is less than about 5 pounds. In other embodiments, the force is less than about 2 pounds.

Through the use of the countertop appliance rolling tray 10, the amount of energy needed to move the countertop appliance 14 that is placed on the countertop appliance rolling tray 10 is less than the energy needed to move the countertop appliance by lifting the countertop appliance 14 off the countertop 12.

Still another important feature of the countertop appliance rolling tray 10 is that the countertop appliance rolling tray 10 supports the countertop appliance 14 with a high degree of stability in both the stationary configuration and the moving configuration to minimize the potential of the countertop appliance 14 falling after being placed on the countertop appliance rolling tray 10 either while the countertop appliance 14 is being stored, while the countertop appliance 14 is being used or while the countertop appliance 14 is being moved from the storage location proximate the back edge of the countertop 12 to the use location proximate the front edge of the countertop 12.

A typical distance between a countertop 12 and a wall-mounted cabinet 16 in kitchens is about 18 inches. Many countertop appliances 14 are fabricated based upon the distance between an upper surface of the countertop 12 and a lower surface of wall-mounted cabinets 16.

Fabricating the countertop appliances 14 with a height that is less than 18 inches enables the countertop appliances 14 to be placed under the wall-mounted cabinet 16 when not in use. Such a configuration enables the countertop appliances 14 to be readily accessible while not interfering with the use of the wall-mounted cabinets 16.

This configuration also minimizes the amount of the countertop 12 that is occupied by the countertop appliance 14 proximate a front edge thereof so that the countertop 12 can be used for other tasks that do not utilize the countertop appliance 14 and thereby increases the likelihood that the countertop appliance 14 will be stored on the countertop 12 instead of being stored in another area.

Enhancing the ability to perform tasks in the kitchen and reducing clutter on the kitchen countertops increases the overall enjoyment of the cooking process, which increases the likelihood that more meals will be cooked in the kitchen and reduces the likelihood of persons substituting fast food meals, which is typically less healthful than home cooked meals.

Particularly with taller countertop appliances 14 such as blenders and coffee makers, these items are designed to fit under the wall-mounted cabinets 12 with a height that is slightly smaller than the distance between the upper surface of the countertop 12 and the lower surface of the wall-mounted cabinet 16.

The height of the countertop appliance 14 is selected based upon the assumption that the countertop appliance 14 will be placed directly on the countertop 12. Therefore, many countertop appliances 14 are formed with a height that is close to about 18 inches. In other embodiments, the countertop appliances 14 have a height that is between about 18 inches and about 16 inches.

To facilitate using the countertop appliance rolling tray 10 with a large proportion of countertop appliances 14 that are intended to fit under wall-mounted kitchen cabinets 16, a distance between the top of the countertop 12 and the support surface 20 is less than about 1 inch. In other embodiments, the distance between the top of the countertop 12 and the support surface 20 is less than about ¾ of an inch.

While certain countertop appliances 14 such as basic toasters have a relatively light weight, other countertop appliances 14 such as blenders, coffee makers and toasters have a relatively large weight. These heavier and/or larger countertop appliances 14 may present challenges for a person to lift and move. In many situations, countertop appliances 14 are formed with feet or other surface that contacts the countertop that resists movement such as rubber, which presents challenges to sliding the countertop appliance 14 on the countertop.

Rather than attempting the move the heavier and/or larger countertop appliances to a different location on the countertop, these types of countertop appliances may be placed at less convenient locations in the kitchen. Such less convenient locations may cause the person using the countertop kitchen appliances to significantly increase the distance that the person needs to walk when cooking certain items. Additionally, the less convenient placement of the countertop appliances may require heavy and/or hot objects to be carried further distances, which increases the potential of such items dropping and/or causing injury to persons cooking in the kitchen. Alternatively, the countertop appliances may be stored in a cabinet or pantry.

The countertop appliance rolling tray 10 generally includes a support surface 20. In certain embodiments, the support surface 20 is fabricated with an elongated configuration that is selected with a width and a length based on the dimensions of the countertop appliance 14 that is intended to be placed on the support surface 20. In certain embodiments, the width and the length of the support surface 20 are each between about 5 inches and about 20 inches. In other embodiments, the width and the length of the support surface 20 are each between about 10 inches and about 15 inches.

While it is illustrated that the support surface 20 has a generally rectangular shape, it is possible for the support surface 20 to be formed with alternative shapes using the concepts of the invention, examples of which include square, round and oval.

The support surface 20 may generally include a front edge 30, a back edge 32, a first side edge 34 and a second side edge 36. In certain embodiments, the front edge 30 may have a length that is approximately equal to a length of the back edge 32 and the first side edge 34 may have a length that is approximately equal to a length of the second side edge 36.

The support surface 20 may be fabricated from a material that resists bending and/or deformation when the countertop appliance is placed thereon. The support surface 20 should also be fabricated from a material that resists damage and/or deformation such as from heat emitted by the countertop appliance. In certain embodiments, the support surface 20 is fabricated from a metallic or polymeric material.

At least a portion of the support surface 20 may have a reduced slip coating 38 to reduce the potential of the countertop appliance 14 placed thereon from moving with respect to the support surface 20. While it is illustrated that the reduced slip coating 38 substantially covers the support surface 20, such a configuration is not necessary. Rather, the reduced slip coating 38 needs to be located where at least a portion of the countertop appliance 14 contacts the support surface 20.

In another embodiment, an adhesive may be positioned proximate to where the countertop appliance 14 contacts support surface 20 to reduce the potential of the countertop appliance 14 moving with respect to the countertop appliance rolling tray 10.

In still other embodiments, a mechanical fastener such as a screw or clip (not shown) may be used to attach the countertop appliance 14 to the support surface 20 to prevent the countertop appliance 14 from moving with respect to the countertop appliance rolling tray 10.

To assist in positioning the countertop appliance 12 on the support surface 20, a lip 22 may extend from the support surface 20 at least partly around the support surface 20. In certain embodiments, the lip 22 extends substantially around the support surface 20. Alternatively or additionally, the countertop appliance rolling tray 10 may include text and/or images on the surface thereof that assist users to position the countertop appliance on the countertop appliance rolling tray 10. For example, an outline of a base of a blender may be printed on the support surface 20.

The lip 22 may be sufficiently high so that the person placing the countertop appliance 14 on the countertop appliance rolling tray 10 appreciates the boundaries of the support surface 20. In certain embodiments, the lip 22 has a height of less than about ¼ of an inch. Positioning the countertop appliance 14 proximate a center of the support surface 20 may enhance the stability and reduce the potential of the countertop appliance 14 falling after being placed on the countertop appliance rolling tray 10.

The lip 22 also encourages placement of the countertop appliance 14 proximate a center of the countertop appliance rolling tray 10 to minimize the potential of the countertop appliance rolling tray 10 tipping either when the countertop appliance 14 is being used or the countertop appliance rolling tray 10 is being moved with the countertop appliance placed 14 thereon.

To enhance structural integrity of the support surface 20, a side wall 24 may extend from the support surface 20. While the drawings illustrate that the side wall 24 extends downwardly towards the surface on which the countertop appliance rolling tray 10 is placed, it is possible for the side wall 24 to be directed upwardly. In certain embodiments the side wall 24 extends substantially around the support surface 20.

When the countertop appliance rolling tray 10 is in a stationary configuration, at least a portion of the side wall 24 may contact the countertop 12 or other surface on which the countertop appliance rolling tray 10 is placed. When the countertop appliance rolling tray 10 is in a moving configuration, substantially none of the side wall 24 contacts the countertop 12.

On a lower surface of the support surface 20 proximate the back edge 32, a first low friction moving device 40 is provided, as illustrated in FIG. 3. The first low friction moving device 40 facilitates movement of the countertop appliance rolling tray 10 on the countertop 12.

One of the first low friction moving devices 40 is positioned proximate the intersection of the back edge 32 and the first side edge 34 and one of the first low friction moving devices 40 is positioned proximate the intersection of the back edge 32 and the second side edge 36.

A lower surface of the low friction moving device 40 extends a distance from the support surface 20 that is greater than a distance that the side wall 24 extends from support surface 20. In certain embodiments, the difference between the distance the lower surface of the first low friction moving device 40 extends from the support surface 20 and the distance the side wall 24 extends from the support surface 20 is less than about ¼ of an inch.

In certain embodiments, the first low friction moving devices 40 are positioned proximate the side edges 34, 36. As used herein, proximate means that a distance between the low friction moving device 40 and the closest side edge 34, 36 is less than about 20 percent of a distance between the side edges 34, 36. In other embodiments, the distance between the low friction moving device 40 and the closest side edge 34, 36 is between about 10 and 15 percent of the distance between the side edges 34, 36. To enhance the stability of the countertop appliance rolling tray 10, the distance between each of the first low friction moving devices 40 and the side edge 34, 36 is about equal.

In certain embodiments, the first low friction moving devices 40 are positioned proximate the back edge 32. As used herein, proximate means that a distance between the first low friction moving device 40 and the back edge 32 is less than about 20 percent of a distance between the front edge 30 and the back edge 32. In other embodiments, the distance between the first low friction moving device 40 and the back edge 32 is between about 10 and 15 percent of the distance between the front edge 30 and the back edge 32. To enhance the stability of the countertop appliance rolling tray 10, the distance between each of the low friction moving devices 40 and the back edge 32 is about equal.

In certain embodiments, the first low friction moving device 40 is at least one wheel. The at least one wheel may have a relatively small diameter such as less than about ½ of an inch so that the support surface 20 may be a small distance from the countertop 12 on which the countertop appliance rolling tray 10 is placed. In another embodiment, the first low friction moving device 40 is fabricated from a low friction material such as TEFLON™. Such a device would slide along the countertop as opposed to rolling on the countertop.

On the lower surface of the support surface 20 proximate the front edge 30, a high friction support 42 is provided, as illustrated in FIG. 3. The high friction support 42 resists movement of the countertop appliance rolling tray 10 with respect to the countertop 12 when the high friction support 42 is in contact with the countertop 12. An example of one suitable high friction support 42 is rubber. The high friction support 42 may be positioned proximate the intersection of the front edge 30 and the first side edge 34 and proximate the intersection of the front edge 30 and the second side edge 36. A spacing between the high friction support 42 may be similar to a spacing between the first low friction moving device 40.

In certain embodiments, the high friction supports 42 are positioned proximate the side edges 34, 36. As used herein, proximate means that a distance between the high friction support 42 and the closest side edge 34, 36 is less than about 20 percent of a distance between the side edges 34, 36. In other embodiments, the distance between the high friction support 42 and the closest side edge 34, 36 is between about 10 and 15 percent of the distance between the side edges 34, 36. To enhance the stability of the countertop appliance rolling tray 10, the distance between each of the high friction supports 42 and the side edge 34, 36 is about equal.

In certain embodiments, the high friction supports 42 are positioned proximate the front edge 30. As used herein, proximate means that a distance between the high friction support 42 and the front edge 30 is less than about 20 percent of a distance between the front edge 30 and the back edge 32. In other embodiments, the distance between the high friction support 42 and the front edge 30 is between about 10 and 15 percent of the distance between the front edge 30 and the back edge 32. To enhance the stability of the countertop appliance rolling tray 10, the distance between each of the high friction supports 42 and the front edge 30 is about equal.

A movement lever 50 is operably mounted with respect to the support surface 20. In certain embodiments, the movement lever 50 is positioned proximate the front edge 30. In certain embodiments, the movement lever 50 is pivotally mounted to a lower side of the support surface 20.

The movement lever 50 is positioned in an interior of the countertop appliance rolling tray 10. Using such a configuration, no portion of the movement lever 50 extends through the front wall 30, the sides walls 34, 36 and the rear wall 32.

The movement lever 50 may have a generally planar central region. An elevated region 54 may extend at least partially around the planar central region. The elevated region 54 thereby enhances the ability of a person to position his/her fingers on the movement lever 50. The elevated region 54 thereby serves as a location identification feature. The elevated region may also reduce the need of the person to visually look at the movement lever 50 when operating the movement lever 50 and/or when moving the countertop appliance rolling tray 10 with the countertop appliance 12 placed thereon.

The elevated region 54 may also enhance the ability of the person moving the countertop appliance rolling tray 10 to remain in contact with the movement lever 50 as the countertop appliance rolling tray 10 is being moved.

The movement lever 50 is pivotally mounted on the interior portion of the countertop appliance rolling tray 10 using a frame element 58. In certain embodiments, the movement lever 50 pivots up to about 20 degrees.

The support surface 20 has an aperture 56 formed therein. The aperture 56 may have a shape that is similar to the shape of the portion of the movement lever 50 that is contacted by the user's fingers. An edge of the aperture 56 that is closest to the front edge 30 is proximate the front edge 30.

Along at least a portion of an edge of the aperture 56 that is closest to the front edge 30 may include a panel 60 that extends downwardly from the support surface 20. The panel 60 may extend substantially across a width of the aperture 56. The panel 60 may have a height that is similar to a height of the side wall 24.

Using this configuration enables the user's fingers to contact the panel when placing a downward force on the movement lever 50. Such contact with the panel enhances the ability of the person to move the countertop appliance rolling tray 10 with the appliance placed thereon. The configuration of the countertop appliance rolling tray 10 is particularly beneficial with heavier countertop appliances since the weight of the countertop appliance 10 may reduce the ability of the wheels 40 to freely roll.

A second low friction moving device 52 is provided on the movement lever 50. The second low friction moving device 52 facilitates movement of the countertop appliance rolling tray 10 on the surface 14. In certain embodiments, the second low friction moving device 52 is at least one wheel. In other embodiments, the second low friction moving device 52 includes two wheels that are mounted in a spaced-apart configuration.

The at least one wheel may have a relatively small diameter so that the support surface 20 may be a small distance from the countertop 12 on which the countertop appliance rolling tray 10 is placed. In certain embodiments, the diameter of the wheel is less than about ½ of an inch. In another embodiment, the low friction moving material is fabricated from a low friction material such as TEFLON™.

Figure 5:
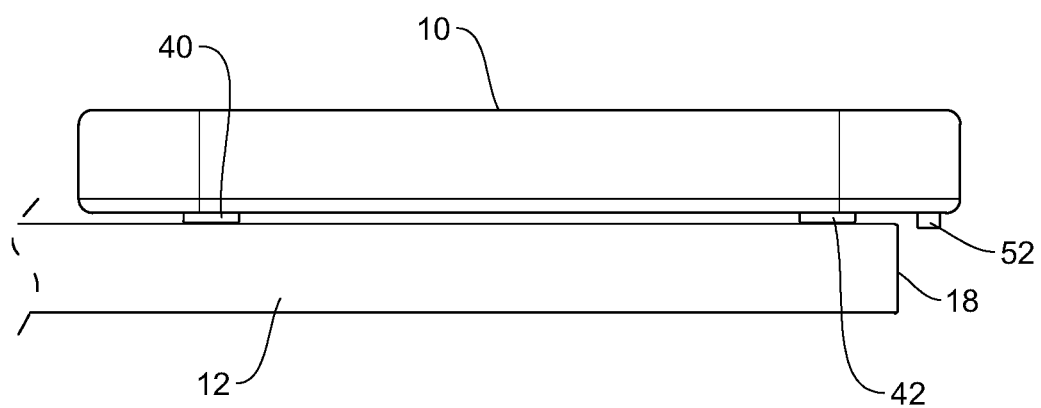
FIG. 5 is a side view of the countertop appliance rolling tray where the second low friction moving device has rolled off a front edge of the countertop.

The second low friction moving device 52 may be positioned closer to the front (proximal) edge 18 of the countertop 12 than the high friction support 42 as illustrated in FIG. 3. Using such a configuration causes the second low friction moving device 52 to roll off the front edge 18 of the countertop 12 while the high friction support 42 is still above the countertop 12. This configuration thereby prevents the countertop appliance rolling tray 10 from rolling off the countertop 12 because the high friction support 42 stops movement of the countertop appliance rolling tray 10 towards the front edge 18 of the countertop 12, as illustrated in FIG. 5.

When this happens, the high friction support 42 contacts the countertop 12 and restricts further movement of the countertop appliance rolling tray 10 towards the front edge 18 of the countertop 12 and thereby prevents the countertop appliance rolling tray 10 and the countertop appliance 14 that is placed thereon from falling off of the countertop 12.

Because the person is placing a downward force on the movement lever 50 during the process of moving the countertop appliance rolling tray 10, this force reduces the potential of the countertop appliance 14 laterally tipping during the movement process. As such, it is possible for the second low friction moving device 52 to be positioned closer together than the first low friction moving device 40 or the high friction support 42.

In certain embodiments the spacing between the second low friction moving device 52 is between about 10 percent and about 30 percent of a distance between the side edges 34, 36. In other embodiments, the distance between the second low friction moving devices 52 is between about 15 percent and about 20 percent of the distance between the side edges 34, 36.

In other embodiments, one of the first low friction moving devices 40 is positioned proximate the back edge 32 and the first side edge 34 and one of the first low friction moving devices 40 is positioned proximate the back edge 32 and the second side edge 36. The at least one wheel may have a relatively small diameter so that the support surface 20 may be a small distance from the surface 14. In another embodiment, the low friction moving material is fabricated from a low friction material such as TEFLON™.

In use, the countertop appliance rolling tray 10 is placed on a countertop 12 and a countertop appliance 14 is placed on the countertop appliance rolling tray 10. In an initial storage position, the countertop appliance rolling tray 10 may be proximate to a distal edge of the countertop 12, as illustrated in FIG. 4. When in the storage portion, at least a portion of the countertop appliance rolling tray 10 and the countertop appliance 14 are located below a cabinet 16.

While the countertop appliance rolling tray 10 is in the storage position, the portion of the countertop 12 proximate the proximal edge thereof may be substantially unobstructed so that this portion of the countertop 12 may be used to perform other tasks without interference from the countertop appliance rolling tray 10 and the countertop appliance 14.

Depending on the nature of the countertop appliance 14 and the spacing between the countertop 12 and the lower surface of the cabinet 16, the proximity of the cabinet 16 to the countertop appliance 14 may impede the ability to use the countertop appliance 14.

When it is desired to use the countertop appliance 14, the user exerts a downward relatively low force on the movement lever 50 to cause the second low friction moving device 52 to engage the countertop 12 and the high friction support 42 to be raised above the countertop surface 12. As used herein, the relatively low force is less than about 5 pounds. In other embodiments, the force is less than about 2 pounds.

With continued downward force on the movement lever 50, the user exerts a force on the movement lever 50 towards the proximal edge of the countertop 12 to cause the countertop appliance rolling tray 10 and the countertop appliance 14 placed thereon to move towards the proximal edge of the countertop 12. The user may also exert a force on the portion of the countertop appliance rolling tray 10 that is proximate the leading edge or the trailing edge of the aperture 56 depending on whether the user is moving the countertop appliance rolling tray 10 towards the proximal or leading edge of the countertop 14.

The force needed to cause the countertop appliance rolling tray 10 with the countertop appliance 14 thereon is relatively low. As used herein, the relatively low force is less than about 5 pounds. In other embodiments, the force is less than about 2 pounds.

Once the countertop appliance rolling tray 10 and the countertop appliance 14 is at a desired position with respect to the countertop 12, the user removes the downward force from the movement lever 50, which causes the movement lever 50 to pivot until the high friction support 42 contacts the countertop 12. The engagement of the high friction support 42 and the countertop 12 causes the countertop appliance rolling tray 10 to resist movement with respect to the countertop.

When the user is done using the countertop appliance 14, the process set forth above is reversed to cause the countertop appliance rolling tray 10 and the countertop appliance 14 to be moved to the storage configuration, which is illustrated in FIG. 8.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A countertop appliance rolling tray comprising:
   a support surface having a front edge, a back edge, a first side edge and a second side edge that extend there around, wherein an aperture is formed in the support surface and wherein the support surface further comprises a side wall extends substantially around the support surface;
   at least one first low friction moving device proximate the back edge of the support surface;
   at least one high friction support proximate the front edge of the support surface; and
   a movement lever operably mounted in an interior of the support surface so that the movement lever is operable through the aperture, wherein the movement lever comprises at least one second low friction moving device, wherein the movement lever is movable between a first position and a second position, wherein when the movement lever is in the second position, a lower surface of the second low friction moving device is lower than a lower surface of the at least one high friction support, wherein no portion of the movement lever extends outside of the front edge, the back edge, the first side edge and the second side edge.

2. The countertop appliance rolling tray of claim 1, wherein the at least one first low friction moving device comprises two low friction moving devices, wherein the at least one of the low friction moving devices is mounted to the support surface proximate the first side edge and one of the low friction moving devices is mounted to the support surface proximate the second side edge, wherein the at least one high friction support comprising a first high friction support and a second high friction support, wherein the first high friction support is mounted to the support surface proximate the first side edge and wherein the second high friction support is mounted to the support surface proximate the second side edge.

3. The countertop appliance rolling tray of claim 1, wherein the at least one first low friction moving device comprises at least one of a wheel and a low friction pad and wherein the at least one high friction support comprises a rubber pad.

4. The countertop appliance rolling tray of claim 1, wherein a distance between an upper surface of the countertop appliance rolling tray and a lower surface of the countertop appliance rolling tray is less than about one inch.

5. The countertop appliance rolling tray of claim 1, wherein the movement lever is operably mounted to the support surface proximate the front edge thereof, wherein the movement lever further comprises a location identification mechanism and wherein the location identification mechanism comprises an elevated region that extends at least partially around the movement lever.

6. The countertop appliance rolling tray of claim 1, wherein at least a portion of an upper surface of the support surface has a reduced slip coating, and wherein the support surface further comprises a lip that extends above an upper surface thereof and the lip extends substantially around the support surface and wherein the side wall extends below a lower surface of the support surface.

7. The countertop appliance rolling tray of claim 1, wherein the second low friction moving device is closer to the front edge of the support surface than the at least one high friction support.

8. A method of using of a countertop appliance comprising:
   providing a countertop appliance rolling tray comprising a support surface, at least one low friction moving device, at least one high friction support and a movement lever, wherein the support surface has a front edge, a back edge, a first side edge and a second side edge that extend there around, wherein the support surface further comprises a side wall extends substantially around the support surface, wherein an aperture is formed in the support surface, wherein the at least one first low friction moving device is proximate the back edge of the support surface, wherein the at least one high friction support is proximate the front edge of the support surface, wherein the movement lever is operably mounted with respect to the support surface, wherein the movement lever comprises at least one second low friction moving device and wherein no portion of the movement lever extends outside of the front edge, the back edge, the first side edge and the second side edge;
   placing the countertop appliance rolling tray on a countertop, wherein the countertop has a proximal edge and a distal edge;
   placing a countertop appliance on the countertop appliance rolling tray;
   applying a force through the aperture to the movement lever to:
      move the movement lever to a second position where a lower surface of the second low friction moving device is lower than a lower surface of the at least one high friction support; and
      move the countertop appliance rolling tray to a use position proximate the proximal edge of the countertop, wherein at least a portion of the force is applied to the support surface proximate a leading edge or a trailing edge of the aperture; and
      discontinuing the force to permit the movement lever to move to a first position where the lower surface of the second low friction moving device is not lower than the lower surface of the at least one high friction support.

9. The method of claim 8, wherein an object is mounted above the countertop, wherein before the countertop appliance rolling tray is moved to the use position, the countertop appliance rolling tray is in a storage position proximate the distal edge of the countertop, wherein when the countertop appliance rolling tray is in the storage position, the countertop appliance is at least partially under the object, wherein the countertop appliance has an operational feature, wherein when the countertop appliance rolling tray is in the storage position, the object impedes a user from performing the operational feature and wherein when the countertop appliance rolling tray is in the use position, the object does not impede a user from performing the operational feature.

10. The method of claim 8, wherein the force is less than about 5 pounds.

11. The method of claim 8, and further comprising identifying a location at which the force is applied to herein the movement lever with a location identification mechanism on a surface of the movement lever, wherein the location identification mechanism comprises an elevated region that extends at least partially around the movement lever.

12. The method of claim 8, wherein the second low friction moving device is closer to the proximal edge of the support surface than the at least one high friction support and wherein when the countertop appliance rolling tray is being moved to the use position and the second low friction moving device moves beyond the proximal edge of the countertop, the at least one high friction support contacts the countertop and restricts movement of the countertop appliance rolling tray.

13. A countertop appliance system comprising:
   a countertop appliance; and
   a countertop appliance rolling tray comprising:
      a support surface having a front edge, a back edge, a first side edge and a second side edge that extend there around, wherein an aperture is formed in the support surface and wherein the support surface further comprises a side wall extends substantially around the support surface;
      at least one first low friction moving device proximate the back edge of the support surface;
      at least one high friction support proximate the front edge of the support surface; and
      a movement lever operably mounted in an interior of the support surface so that the movement lever is operable through the aperture, wherein the movement lever comprises at least one second low friction moving device, wherein the movement lever is movable between a first position and a second position, wherein when the movement lever is in the second position, a lower surface of the second low friction moving device is lower than a lower surface of the at least one high friction support and wherein no portion of the movement lever extends outside of the front edge, the back edge, the first side edge and the second side edge.

14. The countertop appliance system of claim 13, wherein the countertop appliance is a blender, a coffee maker or a toaster.

15. The countertop appliance system of claim 13, wherein the at least one first low friction moving device comprises at least one of a wheel and a low friction pad and wherein the at least one high friction support comprises a rubber pad.

16. The countertop appliance system of claim 13, wherein a distance between an upper surface of the countertop appliance rolling tray and a lower surface of the countertop appliance rolling tray is less than about one inch and wherein the movement lever is operably mounted to the support surface proximate the front edge thereof.

17. The countertop appliance system of claim 13, wherein at least a portion of an upper surface of the support surface has a reduced slip coating, and wherein the support surface further comprises a lip that extends above an upper surface thereof and the lip extends substantially around the support surface and wherein the side wall that extends below a lower surface of the support surface.

18. The countertop appliance system of claim 13, wherein the movement lever further comprises a location identification mechanism and wherein the location identification mechanism comprises an elevated region that extends at least partially around the movement lever.

\* \* \* \* \*